(12) United States Patent
Trutschel

(10) Patent No.: US 6,478,539 B1
(45) Date of Patent: Nov. 12, 2002

(54) BLADE STRUCTURE FOR A GAS TURBINE ENGINE

(75) Inventor: Ralf Trutschel, Manebach (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/651,157

(22) Filed: Aug. 30, 2000

(30) Foreign Application Priority Data

Aug. 30, 1999 (DE) .......................................... 199 41 134

(51) Int. Cl.$^7$ ................................................. F01D 1/00
(52) U.S. Cl. .............................. 415/223 R; 415/223 A; 415/234
(58) Field of Search .................... 415/191, 223 R, 415/234, 243, 223 A, 219 R, 97 R, 90 R

(56) References Cited

U.S. PATENT DOCUMENTS

| | | | |
|---|---|---|---|
| 3,849,023 A | 11/1974 | Klompas | |
| 3,890,062 A | 6/1975 | Hendrix et al. | |
| 5,284,421 A | 2/1994 | Chlus et al. | |
| 5,292,385 A | 3/1994 | Kington | |
| 5,562,419 A | 10/1996 | Crall et al. | |

FOREIGN PATENT DOCUMENTS

| | | |
|---|---|---|
| EP | 0900920 | 3/1999 |
| EP | 0945594 | 9/1999 |
| GB | 514430 | 11/1939 |
| GB | 1233022 | 5/1971 |
| JP | 8177401 | 7/1996 |
| SU | 556238 | 5/1977 |
| WO | WO94/12765 | 6/1994 |
| WO | WO96/15356 | 5/1996 |

OTHER PUBLICATIONS

"Kleine Enzyklopädie der Mathematik" (Little Encyclopaedia of Mathematics), Nachdruck, der2, vvllig überarbeiteten Auflag, 1984, Verlag Harri Deutsch, pp. 192 to 195.
"Taschenbuch der Mathematik" (Pocket Book of Mathematics); 1987; German Democratic Republic, pp. 220 to 223.

*Primary Examiner*—Edward K. Look
*Assistant Examiner*—James M McAleenan
(74) *Attorney, Agent, or Firm*—W. F. Fasse; W. G. Fasse

(57) ABSTRACT

A blade ring for a gas turbine engine, especially an aircraft engine, may be a rotor ring or disk or a stator ring. At least one blade (9) forming an airfoil (2) is secured to at least one carrier ring (1, 10). The blade (9) is fixed to the carrier ring or disk or shroud (1, 10), either through a platform (4) forming a foot portion of the blade or through a neighboring transitional section (12) forming part of the carrier ring or disk or shroud. The mechanical stress and the overall axial length of the blade ring are reduced by a transition fillet (6) between the surfaces (3) of the airfoil (2) and the platform (4) or the peripheral section (12). The transition fillet (6) has a curve (7) that narrows toward the platform (4) or peripheral section (12) with radii (R1, R2, R3) that have different centers and are largest close to the blade surface (3, 8) and smallest close to the ring surface. This fillet construction extends all around the blade and relative to an inner ring or disk and/or an outer ring.

11 Claims, 2 Drawing Sheets

BLADE STRUCTURE FOR A GAS TURBINE ENGINE

PRIORITY CLAIM

This application is based on and claims the priority under 35 U.S.C. §119 of German Patent Application 199 41 134.4, filed on Aug. 30, 1999, the entire disclosure of which is incorporated herein by reference.

FIELD OF THE INVENTION

The invention relates to a blade ring or blade structure for a gas turbine engine, especially an aircraft engine. A ring or disk forms a carrier for at least one blade, that forms an airfoil with its surface and is fixed to the carrier.

BACKGROUND INFORMATION

Blade rings for gas turbine engines usually comprise a carrier such as a disk, or ring, or a housing part, or a shroud to which normally several blades are attached in corresponding holes in the carrier.

When rotor blade rings of fabricated rotors are used in a gas turbine, static flexural torque arises in the blades due to centrifugal forces and due to the force of the gas. Additionally, dynamic flexural torque arises due to blade vibration. To avoid damage, it is important to reduce the resulting mechanical stress at the transition from the blade to the carrier. This stress reduction is also important for rotors with integral blades at the transition of the respective blade to the peripheral surface of the carrier.

Fabricated guide vane rings are blade rings that, as carriers for attaching the blades, generally comprise an annular outer shroud and sometimes an annular inner shroud, and are mounted to an integral component. The vanes are inserted through a recess in the shroud and, e.g. attached by soldering or welding. The annular shroud can be segmented or a closed ring and extends along the longitudinal axis of the gas turbine. The vanes of blade rings basically extend in a radial direction.

As mentioned, when a fabricated guide vane ring is used in a gas turbine, static flexural torque arises in the blades due to the force of the gas, and dynamic flexural torque arises due to blade vibrations. The resulting mechanical stress at the transition between the blade and shroud or carrier must be kept as low as possible.

European Patent Publication EP 0 945 594 A1 diskloses a cooled rotor blade for a gas turbine that has a platform and an inner cooling air passage, whereby the transition from the platform to the blade surface first runs elliptically along the entire perimeter, then in a straight line, then curved to the blade tip.

Japanese Patent Publication JP 8 177 401 A diskloses a turbine rotor with a disk and numerous blades on the perimeter extending essentially in a radial direction. The structure is such that the center of gravity of the blades is offset to the intake side of the blade, and the transition between the blade surface and the peripheral surface of the blade extends radially or elliptically.

The above object has been achieved according to the invention in that a transition area between the surface of the airfoil and trhe platform of the blade carrier such as a ring or disk or shroud has a limited number of at least two radii of different length and with different midpoints or center points. The first radius neighboring the surface of the airfoil is the largest, and the limited number of radii in the direction toward the platform may be part of the blade or of the carrier are successively smaller than the first radius.

SUMMARY OF THE INVENTION

It is an object of the present invention to create a rotor and/or stator construction for a gas turbine engine, wherein the mechanical stress due to flexural torque is very low in the transition area between a blade and its support, while simultaneously keeping the overall axial length of the present blade mountings optimally short. The construction of the present invention is equally applicable to rotor rings or rotor disks and to stator disks or shrouds carrying guide blades. The support is either a ring or disk or shroud or housing wall.

An advantage of such a transition area construction also referred to herein as fillet is that the axial length of the blade carrier is less than it would be if the transition area has a circular transition under corresponding conditions due to the curvature that narrows toward the platform or the peripheral section of the carrier neighboring the airfoil at the transition between the surface of the airfoil and the platform or the peripheral section which may form the platform as part of the carrier rather than as part of the blade. In addition, the mechanical stress is less from the flexural torque than if there was no fillet or a fillet with a circular curvature surface forming the transition area. The narrowing curvature or its path can be realized using any kind of suitable tool means.

The present transition area or fillet is constructed with at least two different radii, whereby the radii toward the platform become successively smaller. The transition is hence comparatively easy to manufacture. In comparison to a circular fillet, the mechanical stress is less due to flexural torque with the same volume of the fillet. In addition, the overall axial length of the ring platform carrying the blades is reduced by this feature of the invention.

Given the same stress level at the transition, the volume of the fillet with a curvature according to the invention may be less than that of a fillet having a circular transition curvature. In addition, any deviations from an aerodynamically optimal design are small. Furthermore, not only is the axial platform length reduced, the mass of the ring is also reduced.

In an alternative embodiment, the transition curvature between a curvature neighboring the platform and a curvature neighboring the surface of the airfoil, can be any continuous function, or it can even be a straight line or several sections of a straight line joining one curvature with the other.

The blade ring can be a rotor blade ring, especially for a fabricated rotor where the blade is a rotor blade and the carrier is a rotor carrier such as a disk or ring.

The rotor with integral blades can have rotor blades that extend in an essentially radial direction and are affixed to the peripheral surface of a rotor carrier such as a disk or ring. The platform is formed by a section of the peripheral surface or portion of the rotor carrier neighboring the radially inner blade end, or blade foot and the transition from the surface of the rotor blade in this peripheral carrier portion is defined by a narrowing curve with a radius smaller than the radius of the curvature next to the blade surface. When mounted, the surface of the platform forms a section of the peripheral surface otherwise formed by the shroud. This feature is provided even in a guide blade ring.

Alternatively, the blade ring can be constructed as a fabricated stator guide vane ring that comprises a carrier with at least one inner or outer shroud with at least one recess for attaching the blade constructed as a vane. Alternatively, a vane ring can be produced by casting or milling so that the recesses are not necessary, and the transition changes into a peripheral section on the carrier side. Such a guide blade ring can be constructed of several segments each with three or four guide blades and the corresponding number of perforations or recesses in the shroud, or it can be a circular ring.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
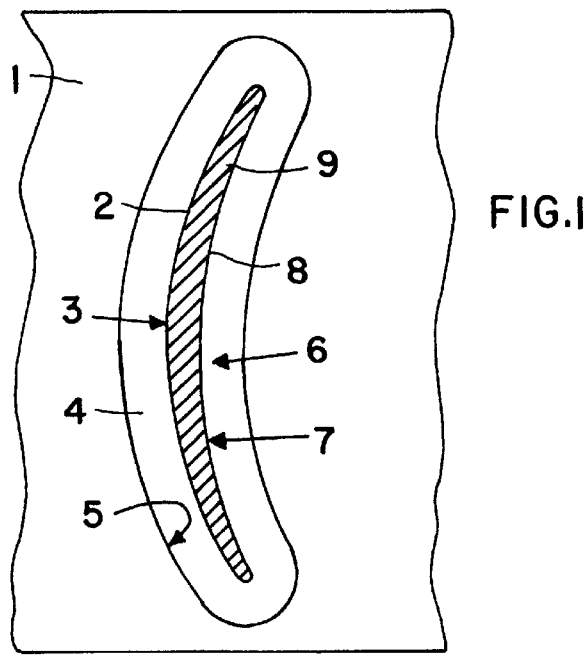
FIG. 1 shows one example of a carrier ring portion with a blade or airfoil along a section line I—I in FIG. 2 and also showing a platform or peripheral portion of the carrier ring according to the invention.
Figure 2:
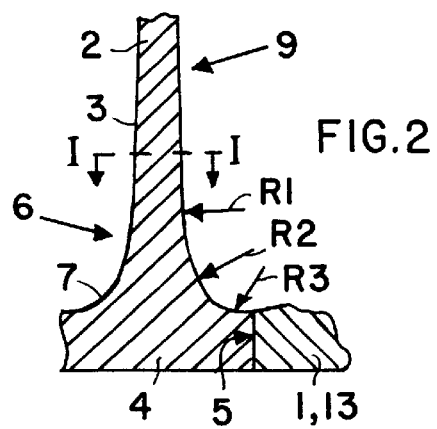
FIG. 2 is a sectional view along section line II—II of the airfoil with a platform or peripheral portion according to FIG. 1, illustrating a fillet configuration according to the invention.
Figure 4:
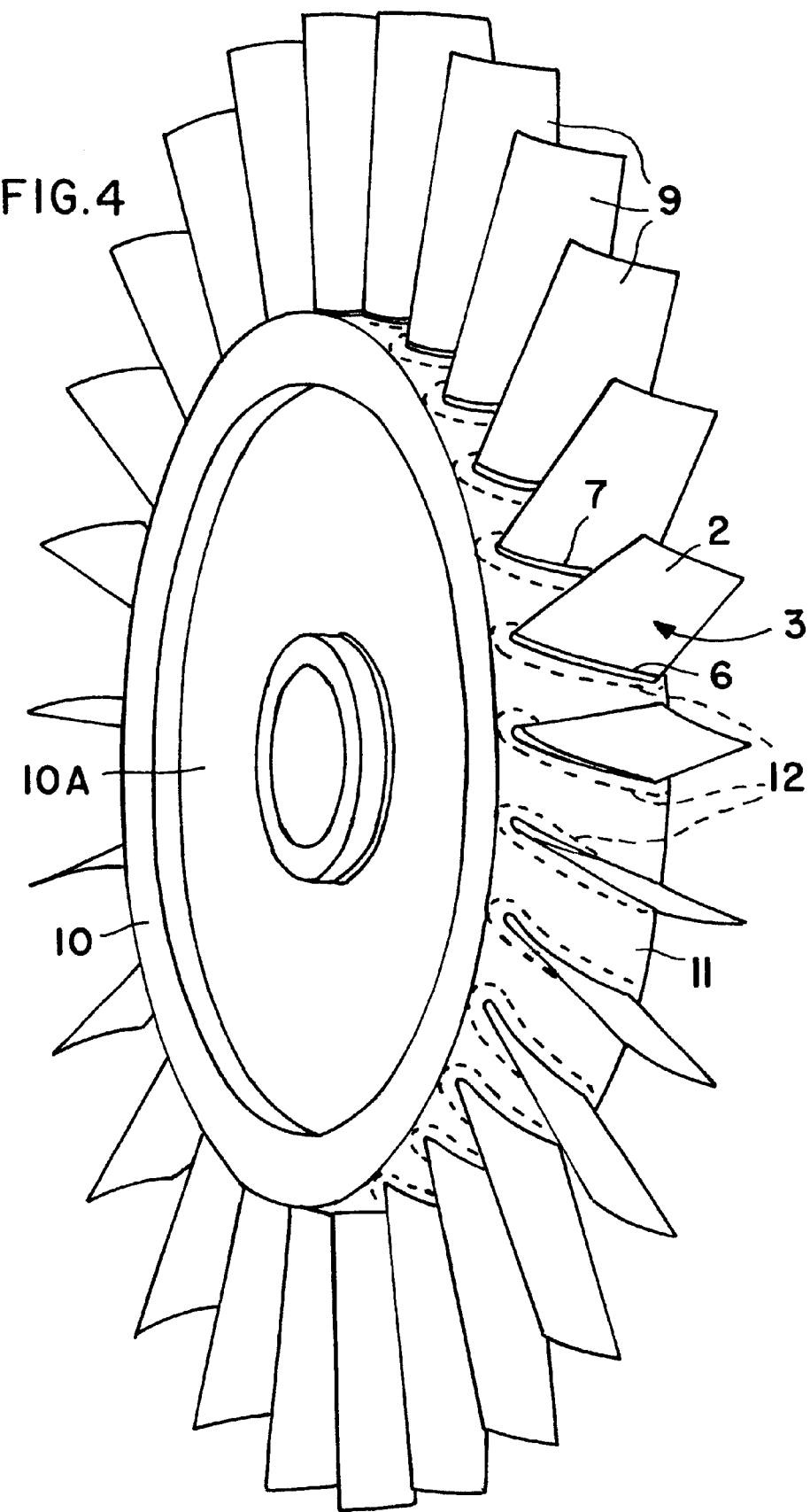
FIG. 4 is a perspective view of a rotor blade disk with integral blades according to another embodiment of the invention.

FIG. 1 shows a view in the radially inward direction and partly in section along section line I—I in FIG. 2 of an example embodiment illustrating a portion of a stator guide or carrier ring forming a shroud 1 and a portion of a flow guide blade 9 forming an airfoil 2 with a convex surface 3, a concave surface 8 and a blade foot. The blade foot of the guide blade 9 forms a platform 4 so that the platform is part of the blade rather than of the carrier ring. In the outer surface of the shroud 1 there are several generally equidistant recesses or holes 5 in which the blade platform 4 is inserted and attached in the recess, e.g. by soldering or welding or brazing. To reduce the resulting mechanical stress from flexural torque due to the force of the gas or due to vibrations, a transition or fillet 6 between the airfoil 2 and the platform 4, or rather the platform surface facing the airfoil 2, is formed as a fillet 6 having a curvature 7 that narrows toward the platform 4. This surface of the platform 4 forms in its mounted position a part of the peripheral shroud surface. Alternately, a guide vane ring can be formed by casting or milling in combination with a portion of the peripheral surface of the carrier ring or shroud 1, i.e., a peripheral portion 12 neighboring the platform 4 as seen in FIG. 4.

FIG. 2 shows a section of a rotor with a blade 9 comprising an airfoil 2 with a surface 3. A platform 4 is formed at the radially inner end of the blade 9. A transition 6 is formed as a fillet where the surface 3 of the airfoil 2 transitions into the platform 4 for reducing the arising mechanical stress. The type of curvature 7 of the outer surface of the respective fillet 6 is essentially determined by the permissible maximum stress at the fillet 6. Since the fillet 6 with its curvature 7 extends along the entire perimeter 8 of the airfoil 2, the entire axial length of the fabricated guide blade carrier ring is necessarily enlarged by the platform 4. For this reason, the axial spacing between the rotors and stators in a gas turbine also increases. The increase in the overall axial length of the blade with its foot or platform should be kept as small as possible.

The transition or fillet 6 in the example embodiment of FIG. 2 is formed according to the invention for example by three radii R1, R2, R3 that have different midpoints or center points. The radii length decreases from the surface 3 of the airfoil 2 toward the platform 4, i.e., the radius R1 at the surface 3 of the airfoil 2 is longest, and the radius R3 at the platform 4 is shortest. The radius R2 has an intermediate length. The transition or fillet 6 described in relation to the sectional plane in FIG. 2 extends around the entire perimeter 8 of the airfoil 9 and in particular to its front and rear edge. Instead of radius R2, another path of the curve 7 can be formed between the radii R1 and R3 by any continuous function such as sections or a straight line or sections of a straight line.

Given the three different radii R1, R2, R3 and especially the smallest radius R3 neighboring the platform 4, the entire axial length of the platform 4 and hence the blade ring can have a smaller axial length or width compared to the axial length of a blade carrier ring having a fillet with only one radius. Further, compared to a conventional transition area or fillet of equivalent size, the mechanical stress in the fillet 6 of the invention is less from flexural torque due to the force of the gas and blade vibrations when the gas turbines are operating. In a guide blade carrier ring of a rotor according to the invention formed by casting or milling, the fillet 6 with its curvature 7 transitions into the carrier ring or disk along a peripheral section 12, see FIG. 4.

In a comparison with the same level of stress at the transition area 6, the volume of the transition area or fillet 6 with the curve 7 that narrows toward the platform 4, is less than when the fillet has a circular curved surface, and the mass and overall axial length of the platform 4 are hence also less in a rotor section of the invention.

Figure 3:
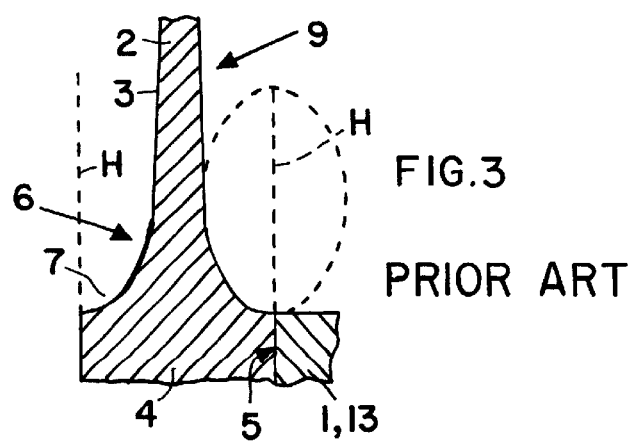
FIG. 3 is a sectional view similar to FIG. 2, but showing a fillet formation of conventional construction.

FIG. 3 shows a conventional construction as disclosed in U.S. Pat. No. 6,190,128 B1 (Fukuno et al.). The curve 7 at the transition or fillet 6 between the surface 3 of the airfoil 2 and the platform 4 is elliptical. The ellipse is shown by a dashed line and its main axis (H), shown by a dash-dotted line is oriented substantially in a radial direction. The term "substantially" here is intended to cover angular deviations from the radial direction as necessary depending on any particular blade configuration and blade position. It is difficult to manufacture such an elliptical transition fillet due to the practically infinite number of transition radii.

The described features of the invention can likewise be used with an arrangement of the blades 9 on an inner or outer ring or shroud and with blade rings that are manufactured differently. As shown, the blade foot or platform 4 is secured to the ring 1 with the radially inner blade end. However, the radially outer blade end may be secured to a respective shroud with fillets having radii according to the invention to form a stator ring.

As an example embodiment of the blade ring according to the invention, FIG. 4 shows a rotor with blades integrally secured to an inner carrier 10 with a rotor disk 10A. Several blades 9 constructed as rotor blades extending in an essentially radially outward direction are secured according to the invention to a peripheral surface 11 of the carrier ring 10 surrounding a disk 10A. Such a blade structure can be manufactured by casting or milling to thereby form the fillet with the radii according to the invention.

To reduce the overall axial length and the mechanical stress due to flexural torque, the blades 9 transition from the surface 3 of the airfoil 2 at a transition or fillet 6 with a curvature 7 into peripheral section 12 which forms a platform as part of the carrier. The curve narrows toward the peripheral section 12 drawn with dashed lines bordering the integral blade 9 rooted in the peripheral surface 11 of the rotor blade carrier ring 10 without a blade platform or foot. The problem of the mechanical stress and overall axial length of the carrier ring 10 is also reduced in this embodiment without a blade platform because the transition area 6 merges into a peripheral section 12 of the surface 11 of the rotor carrier ring 10 with the radii R1, R2, R3 of the invention and the respective fillet runs along the entire perimeter of the surface 3 of the airfoil 2, i.e., including the front and rear edge of the blade.

In another alternative example embodiment, the transition area or fillet 6 with the curve 7 that narrows toward the platform 4 can also be used for a fabricated rotor having separate rather than integral blades 9 which are releasably attached in various ways to a blade carrier ring 10 in correspondingly shaped recesses. A drawing of such an embodiment would essentially correspond to that of FIGS. 2 and 3 where the area neighboring the platform 4 of the blade 9 is not a shroud 1, as is the case with a guide blade ring, but rather a platform 13 of a neighboring rotor blade. The extension of the platforms 4, 13 in a peripheral direction can be varied in a rotor blade ring and is generally greater than in FIGS. 2 and 3. Together, the platforms 4 of the rotor blades 9 or the platforms 13 on the carrier form a peripheral surface when mounted, and the individual platforms 4 therefore represent peripheral sections of a complete carrier ring, carrier disk, or carrier shroud.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A blade structure for a gas turbine engine, said blade structure comprising at least one carrier (1, 10) and at least one blade (9) secured to said carrier, said at least one blade having blade enclosing surfaces (3, 8), a transition fillet (6) positioned along at least one blade end, said transition fillet merging said at least one blade end into a respective carrier surface of said at least one carrier (1, 10), said transition fillet (6) having a non-elliptical transition curvature (7) with a limited number of at least two radii, each radius having a different center point and a successively shorter length so that a radius (R1) next to said blade enclosing surfaces is the longest radius and a radius next to said respective carrier surface is the shortest radius.

2. The blade structure of claim 1, wherein said transition fillet (6) extends all around said at least one blade end.

3. The blade structure of claim 1, wherein said at least one carrier is a rotor ring and wherein said at least one blade is a rotor blade.

4. The blade structure of claim 1, wherein said at least one carrier is a rotor disk and wherein said at least one blade is a rotor blade.

5. The blade structure of claim 1, wherein said at least one blade has a blade platform (4) at said at least one blade end, wherein said at least one carrier has a recess (5) in which said blade platform is secured, and wherein said transition fillet (6) is positioned between said blade platform and said blade surface.

6. The blade structure of claim 1, wherein said at least one blade and said at least one carrier form an integral structure, and wherein said carrier has a peripheral surface (11) merging into said transition fillet.

7. The blade structure of claim 6, wherein said peripheral surface (11) forms a platform all around said at least one blade end.

8. The blade structure of claim 1, constructed as a guide vane ring wherein said carrier is a ring shroud surrounding said at least one blade constructed as a guide vane extending radially inwardly from said ring shroud.

9. The blade construction of claim 8, wherein said carrier ring shroud comprises a plurality of ring shroud sections secured to one another to form a closed ring, and recesses or holes facing radially inwardly from said ring shroud sections, wherein a guide vane is secured in each of said recesses or holes, and wherein said transition fillet (6) surrounds each guide vane next to a radially inwardly facing surface of said ring shroud.

10. The blade structure of claim 8, constructed as a stator for said gas turbine engine.

11. The blade structure of claim 1, wherein said limited number of radii is three including a longest radius curvature section next to said at least one blade, a shortest radius curvature next to said respective carrier surface and an intermediate length radius curvature section between said longest and shortest radius curvature sections.

* * * * *

UNITED STATES PATENT AND TRADEMARK OFFICE
CERTIFICATE OF CORRECTION

PATENT NO. : 6,478,539 B1
DATED : November 12, 2002
INVENTOR(S) : Trutschel

It is certified that error appears in the above-identified patent and that said Letters Patent is hereby corrected as shown below:

<u>Title page,</u>
Item [56], References Cited, U.S. PATENT DOCUMENTS, insert the following:
-- 4,704,066   11/1987   Weissbacher
   5,340,278   08/1994   Magowan
   5,906,474   05/1999   Haller et al.
   6,095,402   08/2000   Brownell et al.
   6,106,233   08/2000   Walker et al.
   6,190,128 B1   02/2001   Fukuno et al. --;
OTHER PUBLICATIONS,
After "der2,", replace "vvllig" by -- voellig --.
Item [57], ABSTRACT,
Line 13, after "with", insert -- a limited number of --;
Line 14, after "are", replace "largest" by -- longest --;
Line 15, before "close", replace "smallest" by -- shortest --.

<u>Column 1,</u>
Lines 59 to 67, delete these entire lines.

<u>Column 2,</u>
Lines 12 and 13, insert the following paragraph:
-- The above object has been achieved according to the invention in that a transition area between the surface of the airfoil and the platform of the blade carrier such as a ring or disk or shroud has a limited number of at least two radii of different length and with different midpoints or center points. The first radius neighboring the surface of the airfoil is the largest, and the limited number of radii in the direction toward the platform may be part of the blade or of the carrier are successively smaller than the first radius. --.

Signed and Sealed this

Twenty-second Day of April, 2003

JAMES E. ROGAN
*Director of the United States Patent and Trademark Office*